United States Patent [19]
Butler

[11] 3,879,241
[45] Apr. 22, 1975

[54] METHOD FOR INSTALLING A WINDOW IN A VEHICLE BODY

[75] Inventor: Douglas S. Butler, Bourne End, England

[73] Assignee: USM Corporation, Boston, Mass.

[22] Filed: Aug. 25, 1971

[21] Appl. No.: 174,718

[30] Foreign Application Priority Data
Sept. 12, 1970 United Kingdom............... 43695/70

[52] U.S. Cl. .................. 156/108; 52/403; 156/275; 296/84 D; 296/93
[51] Int. Cl. .......................... B60j 1/00; B29c 19/06
[58] Field of Search........... 156/275, 108; 296/84 R, 296/93; 252/400, 403

[56] References Cited
UNITED STATES PATENTS
2,647,289 8/1953 Harbert............................ 296/84 R
2,662,045 12/1953 Baggott.............................. 156/275
3,047,703 7/1962 Aske.................................... 156/275
3,118,701 1/1964 Peras ................................... 296/93
3,263,268 8/1966 Flaherty.............................. 156/275
3,542,619 11/1970 McManus ........................... 156/275
3,574,024 4/1971 Rose.................................... 156/108
3,575,463 4/1971 Kolevas................................ 296/93

Primary Examiner—Douglas J. Drummond
Attorney, Agent, or Firm—Benjamin C. Pollard; Vincent A. White; Richard B. Megley

[57] ABSTRACT

Windows are securely installed in vehicles by using a heat curable polymeric material bonding strip to attach the peripheral edge of a window to a flange defining the window opening.

5 Claims, 3 Drawing Figures

PATENTED APR 22 1975 3,879,241

Inventor
Douglas S. Butler
By his Attorney
Cornelius H. Cleary

METHOD FOR INSTALLING A WINDOW IN A VEHICLE BODY

BACKGROUND OF THE INVENTION

The present invention relates to installing windows, windshields and the like in vehicles such as automobiles, trucks, boats, airplanes, etc.

Installing vehicle windows using heat curable polymeric material bonding strips is presently known. The same is disclosed, for example, in U.S. Pat. No. 3,574,024 issued Apr. 6, 1971 to Alan D. Rose. The method referred to therein is dramatically different from previous installing methods; it contributes ease of installation and a high degree of water-tightness in final installed condition, not obtained from practice of other previously known installation methods. In that method, the bonding strip is located between a flange provided in the vehicle opening to be glassed and a marginal portion of the viewing or plane surface of the window. In particular a higher degree of water tightness is achieved over prior methods, yet further improvement in that respect if often desirable.

It is an object of this invention to provide an improved method for installing a window in a vehicle by using heat curable synthetic polymeric material bonding strips, which method shall increase water tightness of the installed window at the site of the bond strip.

BRIEF DESCRIPTION OF THE INVENTION

The object above as well as others may be attained from practice of a method for installing a window in a vehicle body in which an opening for a window is defined by a generally L-shaped flange having a base portion extending inwardly or inboard of said vehicle body and a leg portion upstanding from the inwardly extending end of the base portion. The L-shaped flange is arranged in such a way that when a window is positioned to cover the opening the leg portion of the flange extends in generally parallel relationship to a marginal portion of a viewing or plane surface of the window, and the base portion of the flange extends in generally parallel relation to the peripheral edge surface of the window. Stating it differently, the base portion of the flange extends in at least substantially perpendicular relation to the viewing or plane surface of the window.

The installation method accordingly involves:

a. placing a window in position to obturate the window opening, with marginal portions of the viewing surface of the window adjacent to and overlying the leg portion of the flange and with the peripheral edge surface of the window parallel to and spaced from the base portion of the flange;

b. positioning a preformed strip of tacky, deformable, heat curable synthetic polymeric material so that it is or becomes positioned between the base portion of the flange and the peripheral edge surface of the window with the material in adhesive engagement with the peripheral edge surface of the window and the base portion of the flange; and c. heating the positioned strip material to at least initiate curing thereof so as to form a waterproof, resilient seal between the window and the vehicle part and to bond the window to the vehicle part.

Incidental to carrying out the method above indicated external trim means of suitable shape and size may be installed, and preferably is done by providing it in adhesive engagement with the bonding strip of tacky deformable material, so that in the completed vehicle the trim means is located in a position on the exterior of the vehicle so that, viewed from the outside of the vehicle, the bonding strip is blocked from view. The step of adding the external trim may be carried out after the bonding strip of tacky deformable material has been positioned to secure the window, but preferably is adhesively bonded to the bonding strip before the strip is positioned in the assembly. Trim means, which is primarily designed to mask or obscure the strip of tacky deformable material from view from the outside of the completed vehicle may comprise any suitable material, for example aluminium, stainless steel, polyvinyl chloride or nylon. When the window is a vehicle windshield having four fairly distinct edge surfaces, it is preferred that the trim means comprise four separate lengths of external trim material, i.e., one length for each of the top, bottom and two side edges of the window, and that separate connector pieces are used at the corners of the window to connect together the lengths of external trim material.

Internal trim means, which is intended in the completed vehicle to overlay and hence obscure the flange portions from view from the inside of the vehicle, may also be provided. Conveniently, this trim may be of fabric or polyvinyl chloride sheet material, and is preferably secured to the leg portion of the flange of the vehicle body part before the window is positioned in the window opening. The internal trim is preferably adhesively secured to those surfaces of the leg portion of the flange which the marginal plane surface of the window overlie, so that when the window is positioned in the window opening, the viewing surface of the window may rest against the internal trim.

In carrying out the method of this invention the step of heating the heat curable composition may be carried out in any desirable manner. For example in similar fashion to that described in the cited U.S. Pat. No. 3,574,024 a resistive conductor of electricity may be incorporated in the bonding strip and connected with a source of electricity at an appropriate time in order to heat the conductor and thus heat the strip material. Alternatively, if the trim means at the outside of the vehicle is of metal and capable of performing as a resistive conductor of electricty, the trim means may be connected with a source of electricity after the bonding strip and trim means have been placed in their desired positions, in order to heat the trim means and so heat the strip material. As another alternative, the strip may be heated by a blast of hot air. The extent of heating of the strip material which is required varies in accordance with the composition of the particular bonding strip employed. With the preferred synthetic polymeric materials used to manufacture the strip it is usually necessary to apply only sufficient heat to the strip to initiate curing of the material of the strip to a resilient state in which it forms a tough, resilient and waterproof bond between the peripheral edge of the window and the flange base portion. The bond is sufficiently strong to enable the vehicle to be driven from its production line without displacing the window. With the preferred bonding strip materials further curing occurs gradually over a period of days after the heating has been carried out, and the strength of the bond between the peripheral edge of the window and the flange base portion increases.

In practicing the method of this invention, the bonding strip of tacky deformable composition is preferably sufficiently tacky to assist in its ready application in its allotted position, and sufficiently deformable to facilitate being easily pressed into adhesive engagement with the peripheral edge surface of the window and the flange portions of the vehicle. Materials which may be used in producing the bonding strip are those which are heat curable to a resilient state and which in their uncured state have sufficient surface tackiness to remain in the initially allotted position while further steps of the installing method are carried out. The material from which the bonding strip is produced preferably also has sufficient softness to allow bedding of the strip by light pressure as above referred to, together with absence of recovery when the light pressure is removed. It is also preferred that after heating the bonding strip material displays strong adhesion to the peripheral edge surface of the window and the flange portions of the vehicle, as well as the trim when the same is installed incidental with practicing the method, possibly with the help of a primer, and also have or develop sufficient resilience to withstand vibrations of the window and flange portions when the vehicle is used.

A preferred material from which to produce the bonding strip comprises a curable, polymer which in its uncured state melts to a pourable fluid when heated to a temperature of not more than 60°C. Polymers of that type include butadiene-acrylonitrile copolymers and chloroprene polymers, for example those known as Neoprene FB and Neoprene FC each of which is a stabilized, low molecular weight chloroprene polymer. Neoprene FB crystallizes at a medium rate and Neoprene FC crystallizes at a fast rate, and each has a specific gravity of 1.23 at 25°C. Both of those polymers are low viscosity materials which are soft, crystalline solids at room temperature. They have non-shrink and non-slump properties. It is preferred to employ Neoprene FB and to use that polymer in quantities of not less than 40 percent by weight of the material of the strip. The quantity of the polymer which is used may be reduced if the material of the strip also includes a harder curable polymer, for example, Neoprene AC, but this is often undesirable because a strip may be produced which is too hard for convenient use. If more than 60 percent of the low molecular weight polymer is used the material of the strip may be too soft for convenient use.

Preferably the strip material includes a phenolic resin which imparts tackiness when the strip is in the uncured state and reinforces the composition of the strip after it is cured. The phenolic resin is liquid in its uncured state and is curable when heated in the presence of hexamine. If the phenolic resin is used, it is preferred that it be limited in amount to not more than 7.5 parts by weight per hundred parts by weight of the principal curable polymer.

The strip material may also include finely divided filler material, for example, carbon black, china clay, or asbestos fiber, plasticizer material, for example, non-degraded heat-softened buna rubber, dioctyl sebacate, factice, heavy petroleum distillate or chlorinated wax, and curing and vulcanizing agents, for example, canary litharge.

The strip used in practicing the installing method may have any desired cross-section, but a strip of circular or elliptical cross-section is usually preferable so as to minimize the possibility of trapping air between the interface surface provided between the strip and the window and flange parts.

Once prepared, the strip may be stored at low temperatures when not scheduled for immediate use. Immediately prior to being positioned around the window, the strip is preferably heated slightly in order to remove any crystallization which may have set up during storage.

In some instances it may be desirable to apply a primer to each of the window and flange base portion prior to location of the window and positioning of the strip. While the application of primer is not an essential step in the method, use of a suitable primer generally results in high bond strengths being obtained between the bonding strip and the peripheral edge surface of the window on the one hand, and the bonding strip and the flange on the other, thus providing the vehicle with a desirable safety feature. A solution of a silane (A1020 supplied by Union Carbide), and black finishing grade paint based on high viscosity chlorinated rubber, phenolic resin and epoxidized oil has been found particularly effective as a primer for application to painted steel flange portions and, a silicone solution (Y4310 supplied by Union Carbide) has been found particularly effective as a primer for application to glass windows.

BRIEF DESCRIPTION OF THE DRAWINGS

In the accompanying drawings illustrating one embodiment of the invention.

DETAILED DESCRIPTION OF THE EMBODIMENT SHOWN IN THE DRAWINGS

Figure 1:
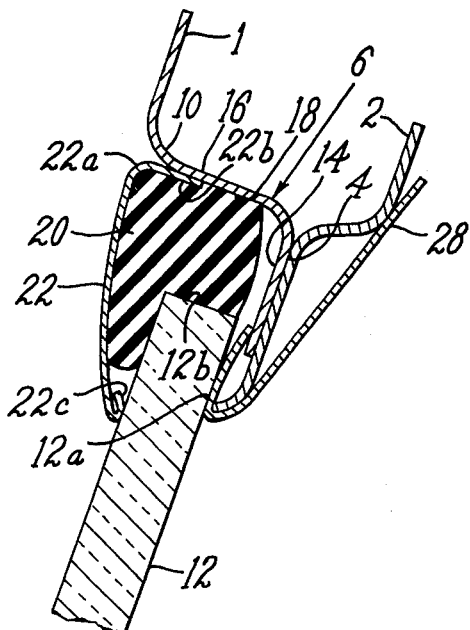
FIG. 1 is a view in transverse section of a window installed in a vehicle opening.

The vehicle body includes formed sheets of metal 1 and 2, which are spot welded together lengthwise at interface 4 to provide a composite flange 6 as shown in FIG. 1, thereby defining a windshield opening of a size suitable to receive a windshield 10. The latter is defined in outline by edge surface 11 and in cross-section by viewing or proximately plane surfaces 12 and 13. The flange 6 is generally L-shaped in cross-section constituting a leg portion 14 and a base portion 16 arranged in such a way that, when the windshield 10 is positioned to cover the window opening, the leg portion 14 of the flange 6 extends in generally parallel relation to adjacent marginal plane portions 12a of the windshield 10. At the same time the base portion 16 of the flange 6 is arranged in such a way that when the windshield 10 is positioned to cover the window opening, the flange base 16 extends perpendicularly to plane surface 12, 12a, and adjacent to the peripheral edge surface 12b of windshield 10. As shown the metal flange 6, both the leg portion 14 and base portion 18, is obscured from view from the inside of the vehicle by means of fabric trim 20.

The peripheral edge 12b of the windshield 10 is bonded to the base portion 16 of flange 6 by a cured resilient, synthetic polymeric material bonding strip 20, the composition of which will be hereinafter described. Sections of metal trim 22 are bonded to the assembly by the bonding strip 20 and, trim 22 is bent sharply at locality 22a to provide a rim portion 22b which is in engagement with a part of the base portion 18 of flange 16. At the other end of the trim 22, considered transversely, a folded section 22c is provided for yieldingly bearing on this windshield.

As indicated previously, the bonding strip used in installing the windshield glass comprises a tacky, synthetic polymeric material which is deformable, heat curable to a resilient state. An example of the preparation of such a material follows in which the following constituents are used:

| Material | Example parts by Weight |
| --- | --- |
| A low molecular weight chloroprene polymer, (Neoprene FB) | 75 |
| An aldehyde amine accelerator (duPont Accelerator 808) | 1.5 |
| An anti-oxidant, (Flectol H) | 1.0 |
| Liquid cashew phenolic resin, (Celobond H 832) | 10 |
| Benzoic Acid | 0.5 |
| Non-degraded heat-softened buna rubber | 20 |
| Canary Litharge | 20 |
| Carbon black | 10 |
| China Clay | 35 |
| Asbestos fiber | 10 |

The constituents are blended together in a cooled heavy duty mixer and on conclusion the mixed material obtained is extruded in the form of an elongated cylindrical strip 20 (FIGS. 2, 3) having a substantially constant cross-section. The material of the bonding strip 20 so produced is soft, tacky, deformable and non-resilient at this time. The bonding strip is desirably stored on a reel in a refrigerated cabinet maintained at about 14°F. prior to usage.

In preparing to secure the windshield in a vehicle body the reel of bonding strip is removed from the refrigerated cabinet and selected lengths of strip 20 are cut off the reel, one for each one of the four edges of a windshield 10 of given dimensions to cover the appropriate peripheral edge surfaces 12b of the same. The bonding strip 20 is then heated for a short time to remove any crystallization which may have occurred in the strip material during storage. The tacky, deformable bonding strip 20 of heat-curable material is bonded to sections of the external trim 22 as shown in FIG. 2, the length of each piece of bonding strip 20 being just sufficient to extend slightly beyond the end of the metal trim 22.

Three rubber spacers 26 are located at selectively spaced points (one shown in FIG. 1) about the periphery of the windshield 10 interposed between peripheral edge surface 12b of the same and the base portion 16 of flange 6. In this manner the windshield glass 10 is positioned centrally of the window opening leaving a space of uniform width between the peripheral edge surface 12b of the windshield 10 and the base portion 16 of the flange 6. The fabric trim or lining 28 is then stuck in position as shown in FIG. 1, and the windshield 10 is placed in position to obturate the window opening, with its lower peripheral edge surface 12b engaging the spacers 26 and marginal plane surface portions 12a overlying the base portions 16 of the L-shaped flange 6 and resting against the fabric lining 28.

Figure 2:
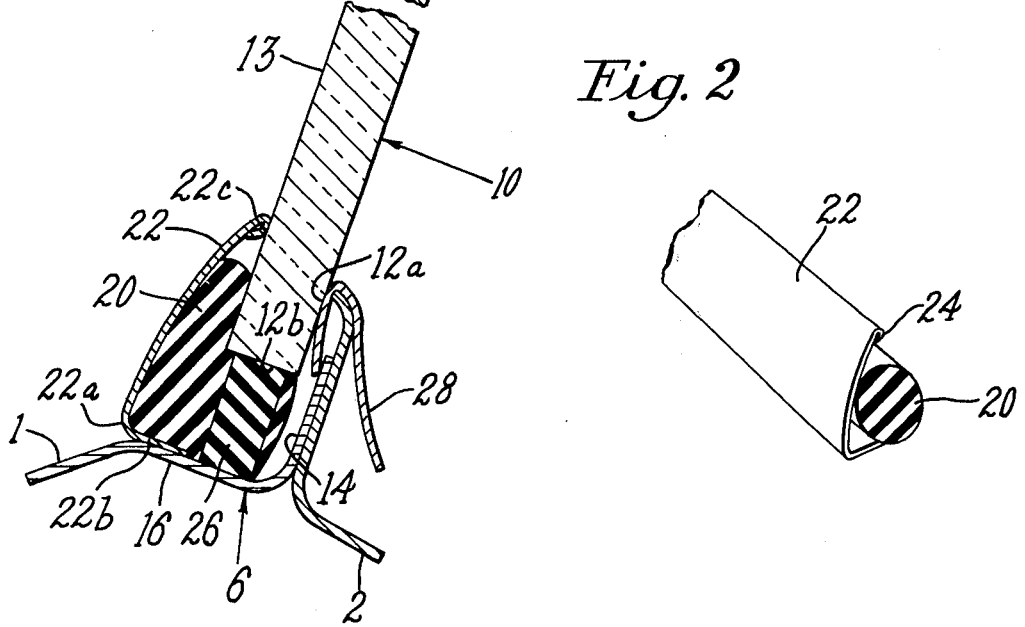
FIG. 2 is a partial, perspective view of a bonding strip preattached to a portion of an external trim section.

The lengths of bonding strip 20 with the metal trim 22 attached as shown in FIG. 2 are then positioned at the requisite side of the windshield and pressed into the gap between the peripheral edge surface 12b of the windshield 10 and the base portion 16 of the flange 6, in such a way that the rim portion 22b of the trim 22 lays along part of the base portion 16 and the folded edge 24 bears against plane surface 13 of the windshield 10, the composition of the strip 20 being pressed into conformity with the peripheral edge portion 12b of the windshield and the base portion 16 of the flange 6. In that configuration the heatcurable strip 20 is subjected to a blast of heat from a heating source such that cure is initiated. When cured to its resilient state the strip 20 bonds the windshield firmly to the body part, forming a watertight seal between the peripheral edge surface 12b of the windshield and the base portion 16 of the flange.

Figure 3:
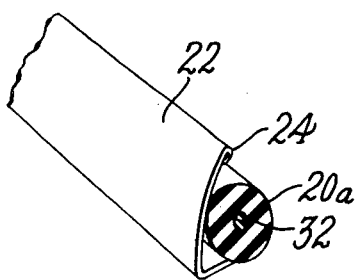
FIG. 3 is a partial, perspective view in section of a bonding strip, including a resistive electrical conductive heating means, preattached to an external trim section.

An alternate process may involve use of the bonding strip 20a with external trim 22 combination shown in FIG. 3. In that instance, the material of the strip 20a is drawn back to expose end portions of a resistive conductor 30, which is located internally and extends over the length of strip 20a. The conductor 32 ends are crossed over one another, as described in U.S. Pat. No. 3,574,024, and connected into a source of electric current, not shown. Electric current is then passed through the wire 30, causing it to become heated, and in turn, heat the strip material to initiate curing of the same.

It will thus be seen that the objects set forth above, among those made apparent from the preceding description, are efficiently attained and, since certain changes may be made in carrying out the above window installing method and the installations set forth without departing from the scope of the invention, it is intended that all matter contained in the above description or shown in the accompanying drawing shall be interpreted as illustrative and not in a limiting sense.

Having thus described my invention, what I claim as new and desire to secure by Letters Patent of the United States is:

1. A method for installing a window in a vehicle body having an L-shaped flange defining a window opening in the body, the flange having a base portion extending inwardly of said vehicle body and a leg portion upstanding from the inward end of said base portion and projecting into the said window opening which comprises, (a) locating a window in position to obturate the window opening with marginal portions of a viewing surface of the window overlying and in engagement with the leg portion of the flange, directly or through an interposed internal trim means and with the peripheral edge surface of the window supported parallel to and spaced from the base portion of the flange; (b) positioning a preformed strip of tacky, deformable, heat curable synthetic polymeric material between the base portion of the flange and the peripheral edge surface of the window with the material in adhesive engagement with the peripheral edge surface of the window and the base portion of the flange, and (c) while maintaining the window in adhered relationship to said flange, heating the strip material to initiate curing thereof to a resilient state.

2. A method according to claim 1 wherein external trim means is adhesively attached to said preformed bonding strip prior to positioning said strip relative to the flange and said bonding strip is pressed into position by said trim means.

3. A method according to claim 1 wherein said internal trim means is adhesively attached to the leg portion of the flange prior to positioning the window in the window opening.

4. A method according to claim 1 wherein heating of the bonding strip is initiated by directing electricity through a resistive conductor for the same located in longitudinal alignment internally of the said bonding strip.

5. A method according to claim 2 wherein the external trim means comprises metal, capable of acting as a resistive electrical conductor for curing the strip and heat to initiate curing of said preformed strip is supplied by passing electricity through said trim means.

* * * * *